United States Patent [19]

Malden

[11] 4,455,572
[45] Jun. 19, 1984

[54] FLICKER FREE STRETCHED GRAMS

[75] Inventor: Ancile E. Malden, Potomac, Md.

[73] Assignee: The United States of America as represented by the Secretary of the Navy, Washington, D.C.

[21] Appl. No.: 339,970

[22] Filed: Jan. 15, 1982

[51] Int. Cl.³ .............................................. H04N 5/14
[52] U.S. Cl. .................... 358/160; 358/140; 358/242
[58] Field of Search ................. 358/140, 160, 242; 340/720, 728, 791; 343/5 DP, 5 VQ

[56] References Cited

U.S. PATENT DOCUMENTS

| | | | |
|---|---|---|---|
| 3,096,398 | 7/1973 | Gabor et al. | 178/6.8 |
| 3,204,026 | 8/1965 | Doundoulakis | 178/6.8 |
| 3,426,344 | 2/1969 | Clark | 340/324 |
| 3,573,789 | 4/1971 | Sharp et al. | 340/324 |
| 3,678,497 | 7/1972 | Watson et al. | 340/324 |
| 3,816,824 | 6/1974 | Thust | 340/789 |
| 3,832,487 | 8/1974 | de Niet | 358/140 |
| 3,877,022 | 4/1975 | Lehman et al. | 340/347 |
| 3,882,270 | 5/1975 | Ogawa | 178/7.1 |
| 3,953,668 | 4/1976 | Judice | 178/6 |
| 3,987,431 | 10/1976 | Ljung | 340/324 |
| 4,063,232 | 12/1977 | Fernald | 340/324 |
| 4,119,954 | 10/1978 | Seitz | 340/728 |
| 4,125,873 | 11/1978 | Chesarek | 364/900 |
| 4,280,133 | 7/1981 | Kato | 358/140 |
| 4,298,888 | 11/1981 | Colles | 358/140 |
| 4,354,186 | 10/1982 | Groothuis | 340/728 |

*Primary Examiner*—Michael A. Masinick
*Attorney, Agent, or Firm*—Robert F. Beers; Frederick A. Wein

[57] ABSTRACT

The present invention relates to apparatus and method for reducing the visual perception of flicker on the optical display having interlaced raster fields. A gram of data is divided into a plurality of designated even and odd alternate pixels. The even pixels are displayed during a line of one of the raster fields and the alternate odd pixels are displayed during an adjacent line of the other interlaced raster field.

7 Claims, 4 Drawing Figures

FLICKER FREE STRETCHED GRAMS

BACKGROUND OF THE INVENTION

The present invention relates to reduction of flicker of an optical display, and more particularly, to reduction of flicker for a stretched gram of a sonar display.

To avoid objectional flicker in a cathode ray tube display, it is customary to have the horizontal components of the characters at least two lines wide. In this manner, because of the 2:1 interlace which is the standard, the perception of flicker by the eye is avoided.

Sonar displays are generated by presenting gray scale data in an interlaced raster format on an optical display. Each line of the display is divided into picture elements called pixels with each of the pixels being displayed at four (ASP) or eight (BQQ-5) intensity levels. The data is refreshed at 20 Hz (ASP) or 26 Hz (BBQ-5) and interlaced 2:1 to avoid the perception of flicker by the operator. This interlacing results in the display of two fields per frame so that field rate is twice the frame rate. With interlaced raster formats, one field is composed of designated odd raster lines and the other field is composed of designated even raster lines. When adjacent data is displayed on both fields, the eye perceives the refresh to be at the field rate instead of at the frame rate. Since the field rate is above a critical flicker fusion frequency, the display appears to be flicker free.

However, when isolated data appears on only one horizontal line, the interlacing has no effect, and the eye perceives the data as being refreshed at the frame rate and thus detects flicker. For alphanumeric data, this problem has been solved by composing character fonts with data placed on both the odd and even fields which is called double dotting. If the line goes on and off at the 30 cycle rate it could be annoying to most viewers. However, if two lines adjacent to each other are alternately turned on and off, no large area of flicker will exist and the effective flicker rate for the large area becomes twice the previous rate. In this situation, horizontal vectors have been doubled to minimize the perception of distracting flicker.

In the usual case, a CRT display is used for showing a plurality of display points and the flicker of any particular portion of the display is reduced when viewed simultaneously with non-flickering portions of the display. Thus, in an optical display having a complex image, the apparent flicker of any one point is reduced because it is simultaneously viewed with non-apparent flickering portions of the raster thus reducing the effect of the flicker by viewing the flickering portion in proximity with another non-flickering portion. However, this is not the case for the optical display of acoustic data such as exhibited in a sonar display.

In some sonar displays the data presented on the screen approaches that of an isolated line which therefore does not receive the benefit of the visual illusion of the eye for reducing flicker when viewed in proximity with non-flickering portions of the display. Acoustic data which is received for display is often in the form of a single gram which for visual optical display purposes is stretched redundantly in the horizontal direction with each pixel becoming a horizontal line of 2, 4, 8 etc. pixels wide. As the acoustic data is redundantly stretched with such data occupying a larger portion of the horizontal scan of a single field, such a display defeats the effect of the interlace as much as the stretched redundant line is displayed on one line of one of the fields and does not receive the benefit of the interlace effect. Thus, the operator perceives flicker. Resort to double dotting as a redundancy of duplicating the stretched gram on a proximate line of the other raster field would cause the display data to occupy two adjacent raster lines and cause a significant loss of resolution.

Accordingly, it is desirable to provide a means for the optical display of acoustic data wherein the visual perception of flicker is minimized. It is also desirable to provide a means for reducing the visual perception of the flicker on an optical display wherein loss of resolution is minimized.

SUMMARY OF THE INVENTION

Briefly, the present invention relates to apparatus and method for reducing the visual perception of flicker on the optical display having interlaced raster fields. A gram of data is divided into a plurality of designated even and odd alternate pixels. The even pixels are displayed during a line of one of the raster fields and the alternate odd pixels are displayed during an adjacent line of the other interlaced raster field.

OBJECTS OF THE INVENTION

With reference to the background of the invention hereinabove, it is an object of the present invention to provide for reducing the visual perception of flicker on an optical display while maintaining acceptable resolution. Another object of the present invention is to provide a means for dividing a gram into a plurality of designated even and odd alternate pixels and displaying odd pixels during a line of one of the interlaced raster fields and displaying the even pixels during an adjacent line of the other interlaced raster field. Still another object of the present invention is to provide a means for reducing the visual perception of flicker in an optical display wherein a write control stores successive pixels, a refresh memory having locations alternately allocated to the respective adjacent raster line is provided, and a command circuitry transfers the pixel information stored in the write control to the allocated locations of the refresh memory.

DESCRIPTION OF THE DRAWINGS

For a better understanding of the present invention reference may be had to the accompanying drawings wherein the same reference numerals have been applied to like parts and wherein.

DETAILED DESCRIPTION OF THE PREFERRED EMBODIMENT

Acoustic data, such as that derived as a reflection from a sonar transponder, is stretched when it is received. The display technique disclosed is for displaying a single line of information without apparent flicker. The received data gram is redundantly stretched along a single horizontal line. However, for display purposes, designated odd pixels of the line are displayed on a first raster field line and designated even pixels are displayed on an adjacent line of second interlaced raster field.

Referring now to Table I, assuming that each pixel comprises 2 bits, one bit being a high order bit and the other bit being a low order bit, the intensity of the pixel is defined as shown.

TABLE I

|  | high order bit | low order bit |  |
|---|---|---|---|
| 2 bits/pixel | 0 | 0 | off |
|  | 0 | 1 | low intensity |
|  | 1 | 0 | medium intensity |
|  | 1 | 1 | maximum intensity |

For a line of data, for example, 11001001, this data is redundantly stretched in a horizontal direction such that each pixel is stretched in the horizontal direction by a factor of 2, 4, or 8 depending upon circumstances. Assuming a 4:1 stretch of data, the previously given example data becomes 1111111100000000101010101001010101. Such a stretched gram is now prepared for displaying alternate data pixels on adjacent interlaced raster lines.

Figure 1A:
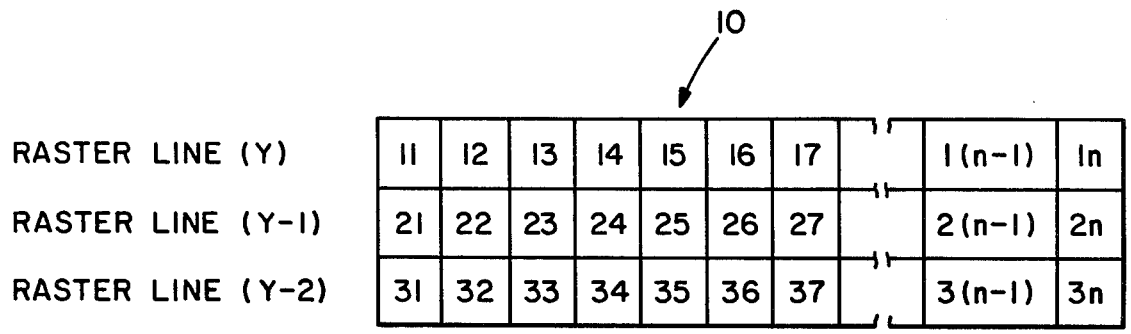
FIGS. 1A and 1B show a representative diagram for providing a flicker free stretched gram.

Referring now to FIG. 1A there is shown a representation, generally designated 10, of a normal display of pixels of acoustic data on an interlaced raster where the pixels for raster line "Y" are appropriately placed in sequence along line "Y" and pixels for each subsequent raster line (Y-1, Y-2 ...) are placed in a similar manner.

Figure 1B:
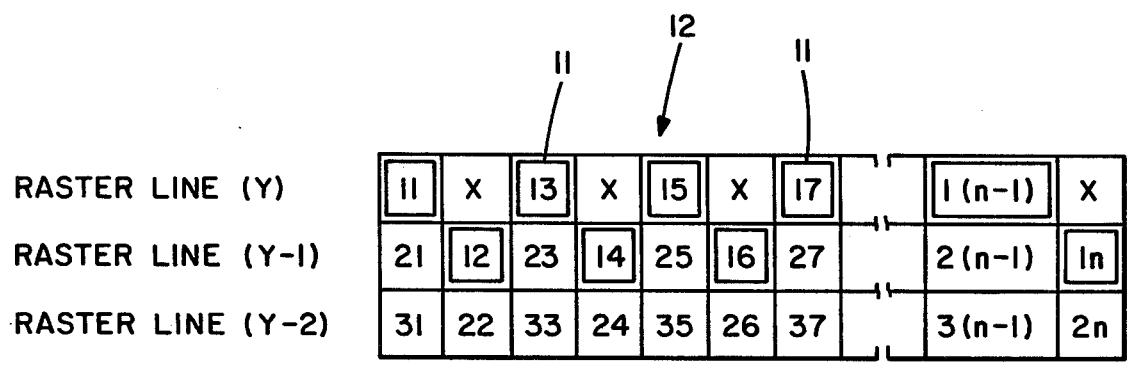

The data line shown in FIG. 1A is divided into alternate designated even pixels and designated odd pixels. On one field all the designated odd pixels are displayed and on an adjacent line of the other interlaced field the even numbered pixels are displayed as shown by the boxed pixels 11 of representation 12 in FIG. 1B. Alternate pixels, e.g., the designated even numbered pixels of line "Y", are vertically transposed onto the line "Y-1" leaving blank the previously vacated position in line "Y" shown by an x. Thus, as is shown in FIG. 1B, line "Y" comprises pixels 11, x, 13, x, ... and designated alternate even numbered pixels 12, 14, 16, ... have been vertically transposed to raster line "Y-1". Thus it is seen that the pixels normally comprising raster line "Y" of FIG. 1A are displayed over two raster lines, i.e., raster line "Y & Y-1". Thus, referring to the stretched example data bits shown herein above when displayed on line of even numbered pixels will be 11xx11xx00xx00xx10xx10xx01xx01xx and the data displayed on the adjacent line of the other interlaced raster field will contain the odd numbered designated pixels as follows: xx11xx11xx00xx00xx10xx10xx01xx01 where the x's represent data bits appearing to the adjacent lines.

Thus, whether the present invention is implemented in either hardware or software, display pixels 11, 13, 15 ... are displayed in one field and pixels 12, 14, 16 ... are displayed in the adjacent interlaced field line. If the data bits comprise a horizontal line, then displaying this line in two fields as shown by the bordered pixels of FIG. 1B instead of one field as conventionally done as shown in FIG. 1A will reduce or eliminate the perception of flicker of an optical display as seen by an eye.

The invention herein disclosed is valid for any number of bits per pixel, e.g., 1, 2, 3, etc., and for various sizes of refresh memory.

It should be noted that horizontal lines would appear slightly jagged due to being displayed in this zig-zag manner but since line spacing on high resolution sensor displays is in the order 0.01 inches, this effect would be very small. A line of data would not be completely displayed until the next line of data is received. This would not affect the utility of the display as the operator is looking for patterns in the data covering a long period of time.

Implementation

The invention disclosed herein can be implemented by either hardware or software.

The Hardware Implementation

Generally, in the hardware implementation a write control circuitry stores successive pixels (1, 2, 3, or more bits each) in a refresh memory having locations allocated to alternate adjacent raster lines as shown in FIG. 1B and disclosed hereinabove.

The refresh memory is divided into two parts, each with separate addressing. One part contains all the designated even pixels (0, 2, 4, 6 ... ) and the other part contains all the designated odd pixels (1, 3, 5, 7 ... ). A write command would automatically store the data in the refresh memory as shown in FIG. 1B.

Figure 2:
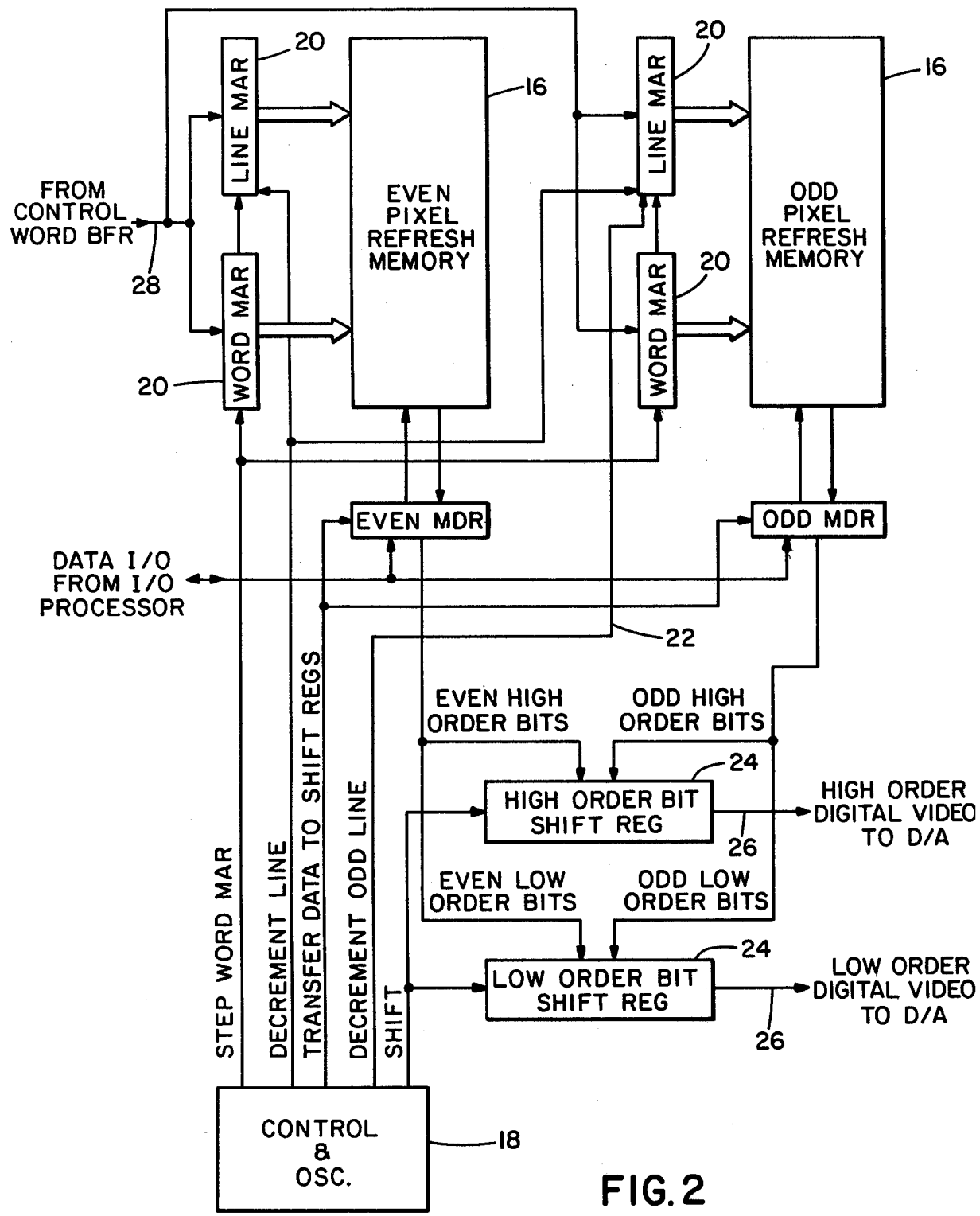
FIG. 2 shows a block diagram schematic of a hardware implementation of the present invention.

Referring now to FIG. 2, there is shown a block diagram schematic of the hardware implementation of the present invention. Gram data is written to refresh memories 16 such that normally one line of data in memory corresponds to one line of a non-flicker free stretched gram. The data is stretched (2:1,4:1 or 8:1) prior to transfer to refresh memory. The data is separated into respective odd and even pixel refresh memories 16. For display refresh at the proper time, control 18 transfers the refresh memory MAR (Memory Address Register) 20 setting to the respective even and odd refresh memory in the MAR to the top line of the gram data. For flicker free displays, a decrement odd line 22 is used to set line MAR 20 for the odd pixel refresh.

Even pixels from the top line of the gram display and the odd pixels from the next to top line of the gram display are read from the respective refresh memories 16 and transferred to shift registers 24 in an interleaved manner, i.e., even, odd, even, odd, ... , with the high order and low order pixel bits going to respective high and low order shift registers 24.

Digital video data is shifted out of the shift registers through lines 26 to digital to analog converters for driving the raster display of a CRT. The word MAR 20 is stepped and the process is repeated until the line of gram data is complete. The word MARs 20 are reset from the control word BFR through line 28 and the line value in the control word buffer is decremented to the next line to be displayed and transferred from the control word BFR to the line MAR 20 followed by another decrement odd line signal. The steps are repeated for each line of each gram on the display.

Software Implementation

Generally, in the software implementation each line of sensor data would be stretched and stored in the display formatter memory. The latest stretched line would be masked against a mask with ones in the odd pixel bit positions. The previous line would be masked with ones in the even pixel bit positions. The results of these two mask operations would then be OR'ed and written to the refresh memory.

Figure 3:
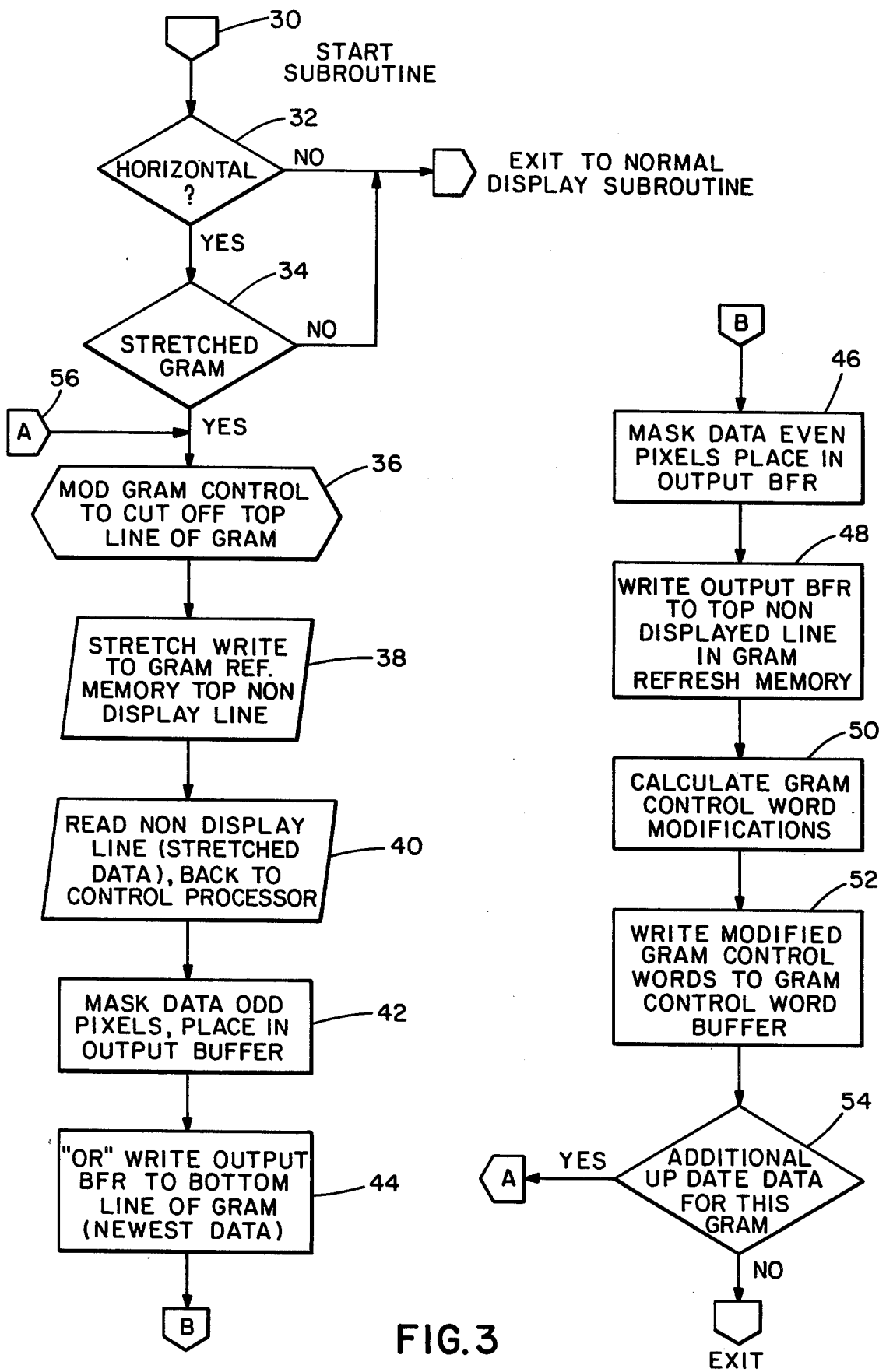
FIG. 3 shows a flow chart for a software implementation of the present invention.

Referring now to FIG. 3, there is shown a flow chart for the software implementation of the flicker free gram. The data is inputted at 30 and the gram is examined at 32 to determine whether or not the data is a horizontal gram. If the data is not horizontal, a decision is made to exit the subroutine. If the data is found to be horizontal, the data is continued for a determination at 34 as to whether it is a stretched gram. If the data is found not to be a stretched gram, the subroutine is exited. If the data is found to be a stretched gram, then the data is transferred to a mod gram control 36 to cut off the top line of the gram and eliminate the display of the oldest gram data prior to updating the refresh memory with new data. Thus, update transients are invisible to the operator. At 38 the stretch of gram data is implemented in write gram hardware (which could be accomplished by software also). The stretch is typically 2:1, 4:1, 8:1. At 40 the stretched gram is read from the gram refresh memory and transferred to the control processor. At 42 the masked data of odd pixels is placed in an output buffer and at 44 the "OR" write output of the BFR is transferred to the bottom line of the gram with the newest data. At 46 the mask data of the even pixels is placed in the output BFR and at 48 the write output of the BFR is transferred to the top nondisplayed line in the gram refresh memory. At 50 the gram control word modifications are calculated and at 52 modified gram control words are transferred to the gram control word buffer. The processed data is than examined for additional update at 54 and if additional update is found to be necessary it is reintroduced at 56. If additional update is not necessary, the subroutine is exited.

Thus there is disclosed herein stretched grams which are flicker free on an optical display. A gram of data is divided into a plurality of designated even and odd alternate pixels. The even pixels are displayed during a line of one of interlaced raster fields and the even pixels are displayed during an adjacent line of the other interlaced raster field. Hardware and software implementations of the present invention are disclosed.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed and new and desired to be secured by Letters Patent is:

1. An apparatus for reducing the visual perception of flicker of data displayable on a single scan line on an optical display having an interlaced first raster field and a second raster field and comprising:
   means for dividing the scan line data into a
   plurality of designated even and designated odd alternate pixels,
   means for displaying the designated odd pixels during a line of one of the raster fields, and
   means for displaying the designated even pixels during an adjacent line of the other raster field.

2. A method for reducing the visual perception of flicker of data displayable on a single scan line on an optical display having an interlaced first raster field and a second raster field and comprising the steps of:
   dividing the scan line data into a plurality of designated even and designated odd alternate pixels,
   displaying the designated odd pixels during a line of one of the raster field, and
   displaying the designated even pixels during an adjacent line of the other raster field.

3. An apparatus for reducing the visual perception of flicker of data stretched in the horizontal scan line direction on an optical display having an interlaced first raster field and a second raster field and comprising:
   means for redundantly stretching the data in the horizontal direction,
   means for divinding the redundantly stretched data into a plurality of designated even and designated odd alternate pixels,
   means for displaying the designated odd pixels during a line of one of the raster fields, and
   means for displaying the designated even pixels during an adjacent line of the other raster field.

4. A method for reducing the visual perception of flicker of data on an optical display having an interlaced first raster field and a second raster field and comprising the steps of:
   redundantly stretching the data in the scan line direction.
   dividing the redundantly stretched gram into a plurality of designated even and designated odd alternate pixels,
   displaying the designated odd pixels during a line of one of the raster fields, and
   displaying the designated even pixels during an adjacent line of the other raster field.

5. An apparatus for reducing the visual perception of flicker of data displayable on a single scan line of an optical display during an interlaced first raster field and a second raster field comprising:
   means for dividing data into a plurality of designated odd and designated even alternate pixels, the designated odd pixels being displayable during a line of one of the raster fields, and the designated even pixels being displayable during an adjacent line of the other raster field, the data when displayed on alternate raster fields having reduced flicker.

6. The apparatus of claim 5 further comprising an output means for connection to an optical display apparatus.

7. The apparatus of claims 1, 3 5, or 6 comprising a refresh memory means having locations alternately allocated to two respective adjacent raster lines, a write control for storing successive pixels, and a command circuitry for storing and transferring the pixel information stored in the write control to the locations of the refresh memory means.

* * * * *